Patented Aug. 12, 1924.

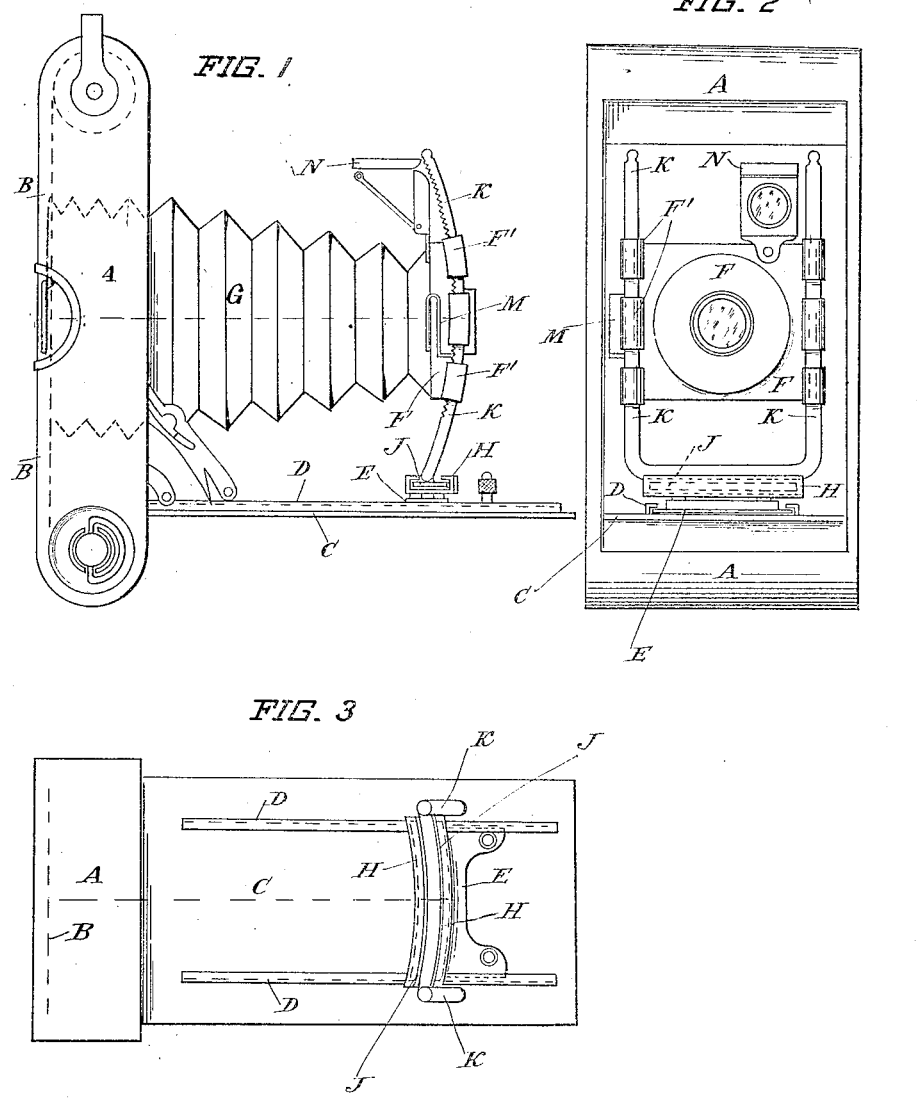

1,504,821

UNITED STATES PATENT OFFICE.

ALBERT HAYWARD, OF AUCKLAND, NEW ZEALAND.

PHOTOGRAPHIC CAMERA.

Application filed November 2, 1921. Serial No. 512,350.

*To all whom it may concern:*

Be it known that I, ALBERT HAYWARD, a subject of the King of Great Britain, residing at 1 New North Road, Eden Terrace, Auckland, New Zealand, have invented a new and useful Improvement in Photographic Cameras, of which the following is a specification.

This invention relates to the well known folding type of photographic camera in which the lens carrier is mounted upon a framing mounted in slides upon a hinged front of the camera case, so that when the said front is turned out, the lens carrier may be moved in and out along it for the purpose of adjusting its focus.

These cameras, as hitherto constructed, provide that the lens carrier may be adjusted vertically upon its supports in order that the centre line of the lens may be directed upon a subject, particularly high buildings, etc., at about the middle of the height thereof. The carrier supports also are made so that the lens may be moved transversely across the base on which it is mounted in order to allow of the said adjustment of the focal line of the lens when the camera is turned on its side. In both of these adjustments the provision for the movement of the lens is such that the movement is parallel to the surface of the sensitized film or plate within the camera. Consequently therefore, if the centre of the lens is in focal line with the central point of the exposed portion of the plate, when the lens is in the central position, should the lens be shifted in either direction, the focal line of the lens centre will be shifted from such film or plate centre, with the result that there is a possibility of some portions of the subject being cut off from the sensitized film or plate, unless extreme care is taken in pointing the camera.

The object of the present invention is to provide improvements in the construction of the camera by means of which the lens in its movements up and down, or transversely, will always maintain a position relative to the film or plate under which its centre will be in direct focal line with the centre of the exposure portion of the said film or plate.

This is effected for the purpose of vertical adjustment by forming the pillars on which the lens carrier is mounted, of arc form made on a radius the centre of which is the central horizontal line of the film or plate and the length of which corresponds with the position of the lens when it is drawn out on its carrier to the "infinity" position. For the purpose of transverse adjustment, the object required, is obtained by constructing the transverse slide in which the said pillars are mounted, of arc form on a radius the centre of which is the central vertical line of the film or plate while its length also corresponds with the line of the lens when drawn out to the infinity position. The very slight difference in the length of the focal line between the "infinity" position and that of the camera's least focal range will not materially affect the relative positions of the lens and film when the lens is positioned at the shorter ranges particularly as at the shortest ranges, adjustment of the nature referred to is not generally required.

The manner of carrying out the invention will differ in connection with cameras of different forms according to the details of the construction thereof. In the accompanying drawings the invention is shewn in its application to an ordinary well known type of folding camera.

In such drawings:—

Figure 1 is a side elevation,

Figure 2 a front elevation, of the camera, and

Figure 3 is a plan of the camera with the lens carrier and bellows removed.

A is the camera case, having the usual provision for mounting the film or plate therein and the exposure line of which is indicated by the dotted line B in Figures 1 and 3. C is the hinged front to such case having the slides D extending longitudinally along it and the slide plate E mounted therein to slide in and out along the front and to carry the lens frame with it. F is the lens frame and G the bellows by means of which it is attached to the case A.

H is the transverse slide that is fixed to the plate E, and J is the block mounted in such slide so as to move across the front C and to which the lens carrier frame is fixed. In this invention this slide and the plate are curved transversely across the front C in an arc having the radius before mentioned and as shewn in Figure 3.

The lens frame F is mounted to move vertically up and down upon the pillars K which pillars at their lower ends are fixed to the block J so that the whole may be moved together in the transverse direction. In this invention each of these pillars K is made to curve outwards from the front in an arc having the radius before mentioned, and as shewn in Figure 1. The lens frame is mounted on the pillars in any approved manner such as to provide for it moving up and down thereon while maintaining a level position. This may be effected by forming the side edges of the frame with sleeves F' that encircle the respective pillars.

Means are provided for locking the lens frame at any point on the pillars to which it may be moved, such means being of any approved nature and such as are already in use in similar circumstances in which the pillars are made straight. The means, as shewn, consist in forming one of the pillars with teeth on its inside and in attaching a spring catch M to the frame which catch engages the teeth in the pillar and holds the frame firmly.

The view finder N is in this invention mounted on the lens frame F so that it will move with it and thus always occupy the same position relatively to the lens.

I claim:—

In cameras of the class herein referred to, the combination with a base plate for the lens carrying frame, and with such lens carrying frame, of a block attached to the bottom of the said frame, and a slide extending transversely across the base in which such block is mounted to move to and fro, such slide being curved in an arc extending forwardly and formed on a radius having as its centre the vertical central line of the camera's exposure opening, substantially as and for the purposes specified.

In testimony whereof, I affix my signature.

ALBERT HAYWARD.

Witnesses:
DAVID BROWN HUTTON,
WILLIAM HENRY McCOMBIE.